United States Patent [19]
Doss, Jr.

[11] 4,081,170
[45] Mar. 28, 1978

[54] CLAMP FOR TUBULAR BODIES

[76] Inventor: Desmond T. Doss, Jr., P.O. Box 36, Englewood, Colo. 80110

[21] Appl. No.: 676,245

[22] Filed: Apr. 12, 1976

[51] Int. Cl.² ............................................. F16K 7/07
[52] U.S. Cl. ................................. 251/5; 24/263 DA; 251/7; 269/29
[58] Field of Search .............. 269/29, 88; 251/4–10; 24/115 G, 263 HW, 263 PJ, 263 LS, 263 A, 263 B, 263 DA, 263 DB, 263 DH, DIG. 26; 128/346

[56] References Cited

U.S. PATENT DOCUMENTS

| | | | |
|---|---|---|---|
| 820,216 | 5/1906 | Leffingwell et al. | 251/10 |
| 1,761,721 | 6/1930 | Gipe | 251/8 |
| 1,809,091 | 4/1928 | Wiken | 251/9 X |
| 2,150,262 | 3/1939 | Brittain | 251/5 |
| 2,663,537 | 12/1953 | Gagne | 251/5 |
| 2,819,113 | 1/1958 | Phillips | 24/263 HW |
| 2,954,028 | 9/1960 | Smith | 251/8 X |
| 3,156,444 | 11/1964 | Black | 251/7 |
| 3,247,852 | 4/1966 | Schneider | 251/10 X |

FOREIGN PATENT DOCUMENTS 440,782   2/1927   Germany ............................ 251/8

*Primary Examiner*—Martin P. Schwadron
*Assistant Examiner*—Richard Gerard
*Attorney, Agent, or Firm*—Ancel W. Lewis, Jr.

[57] ABSTRACT

A clamp particularly suited for pressure-filled fire hoses has a jaw configuration with three clamping edges with minimum spacing between jaw faces at the clamping edges arranged to effectively close off flow without slipping or twisting, structures for locating one or more hose sizes between the jaws to avoid bunching, and a cast support body and handle arrangement to facilitate operation in either of two positions.

21 Claims, 11 Drawing Figures

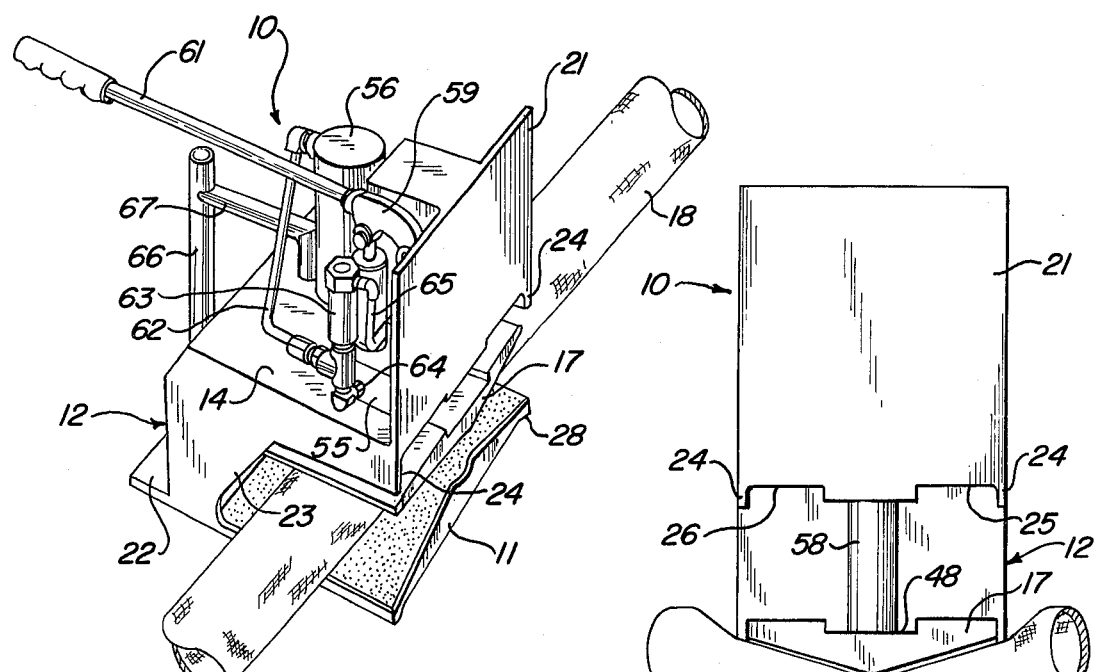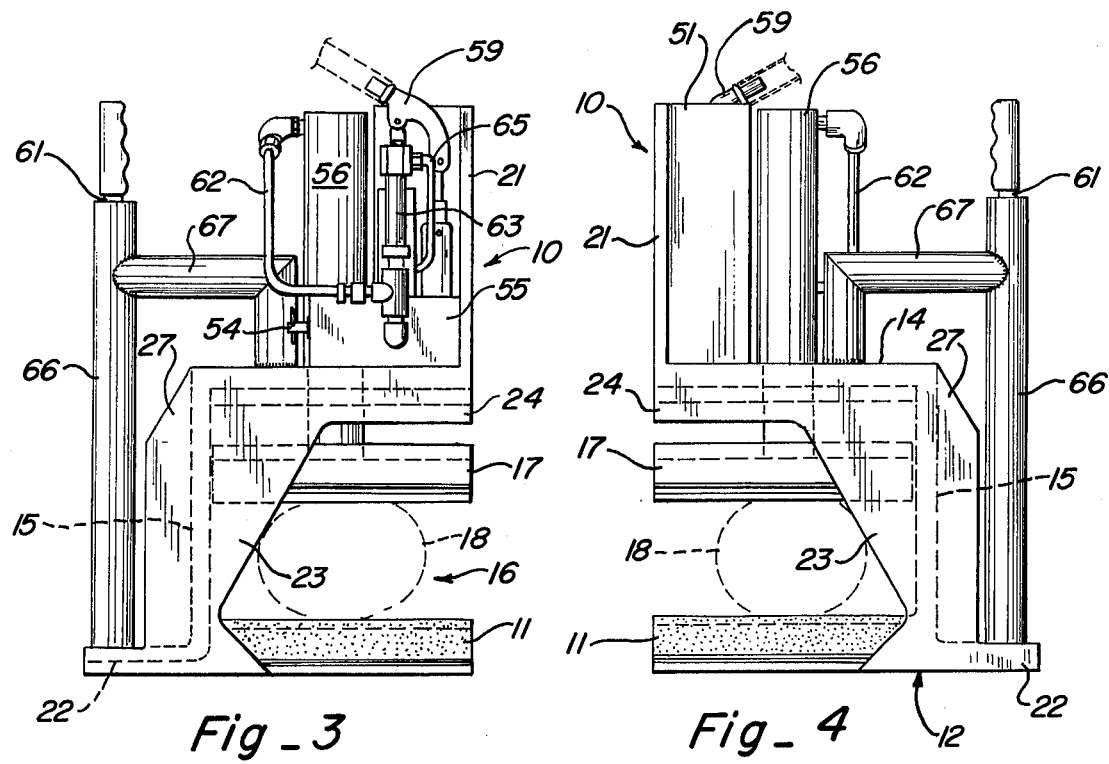

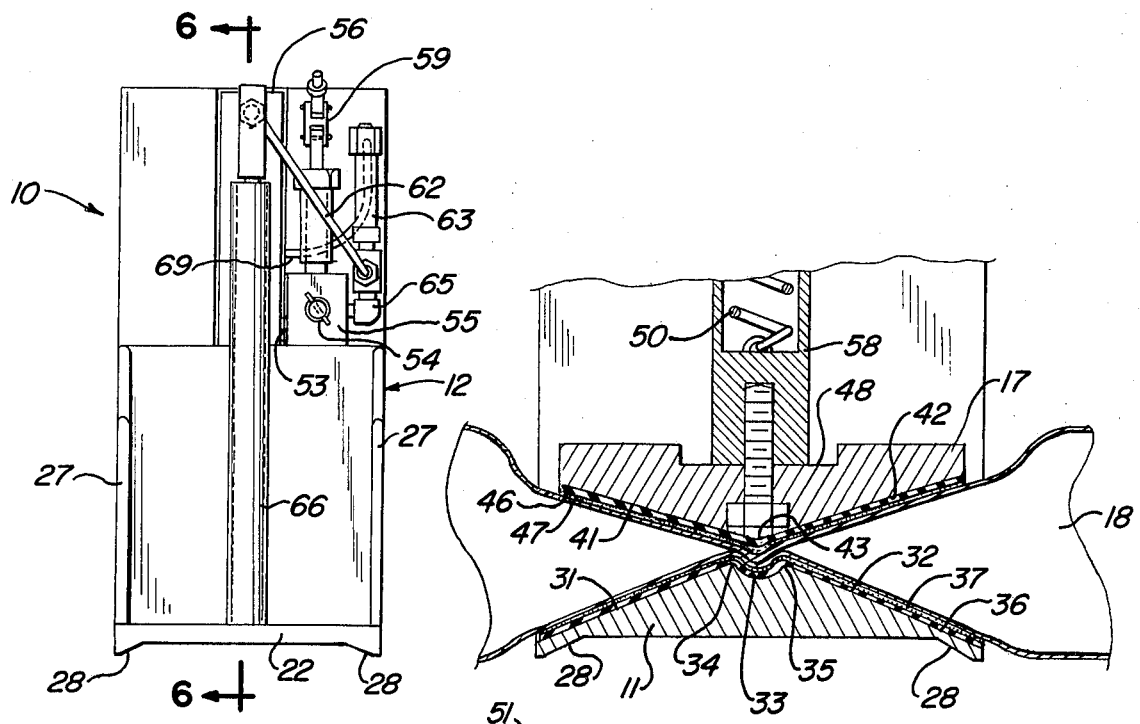
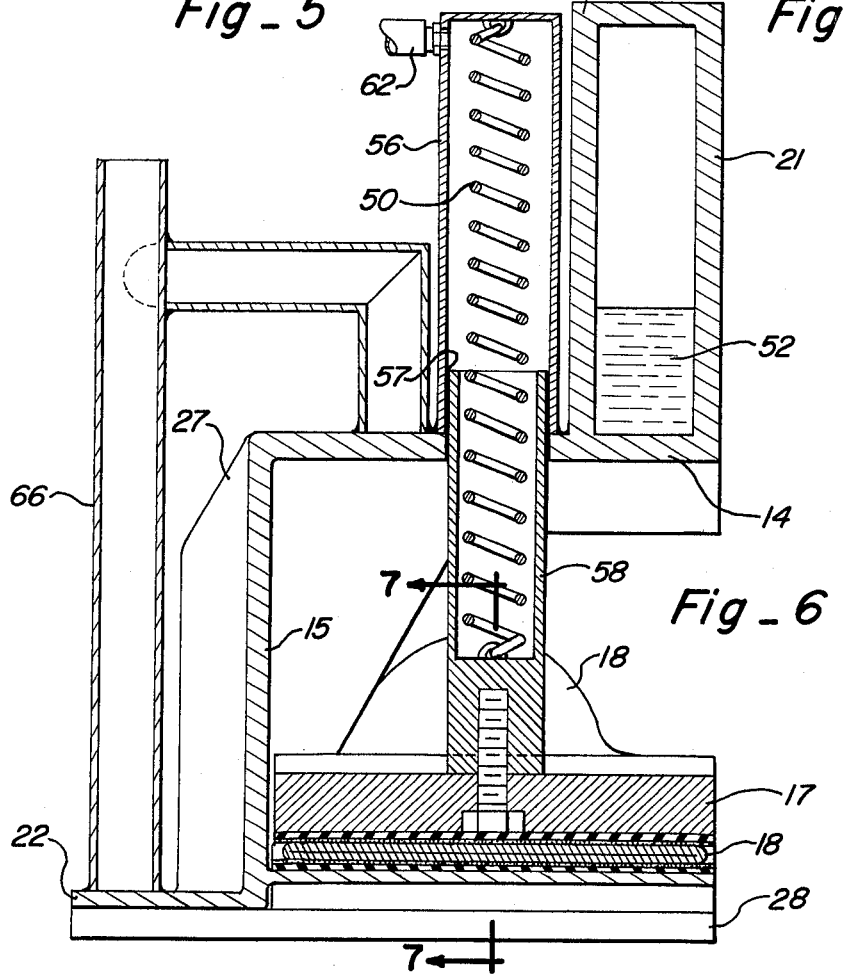
Fig_5
Fig_7
Fig_6

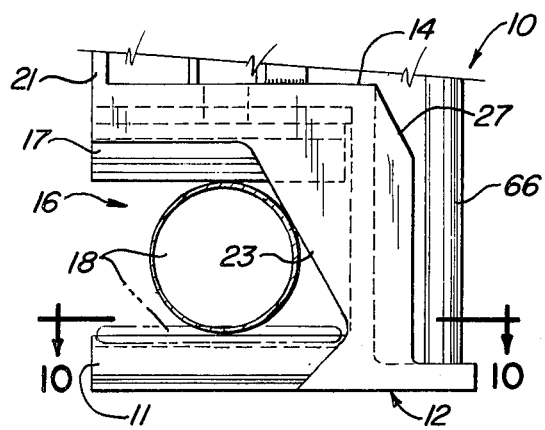
Fig_8
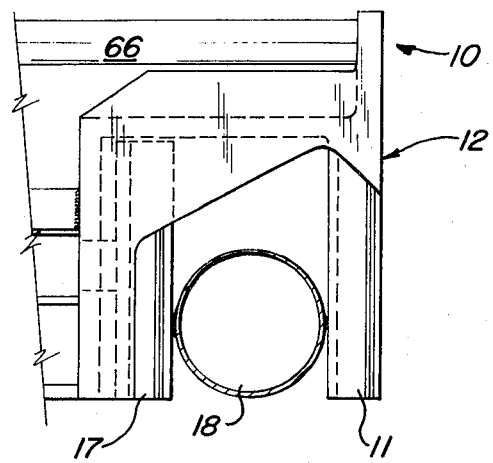
Fig_9
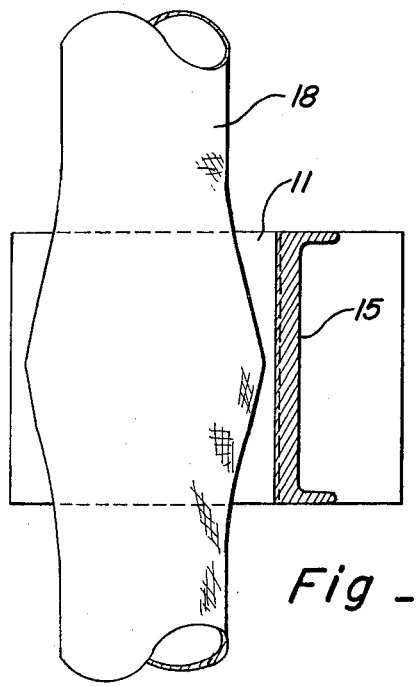
Fig_10
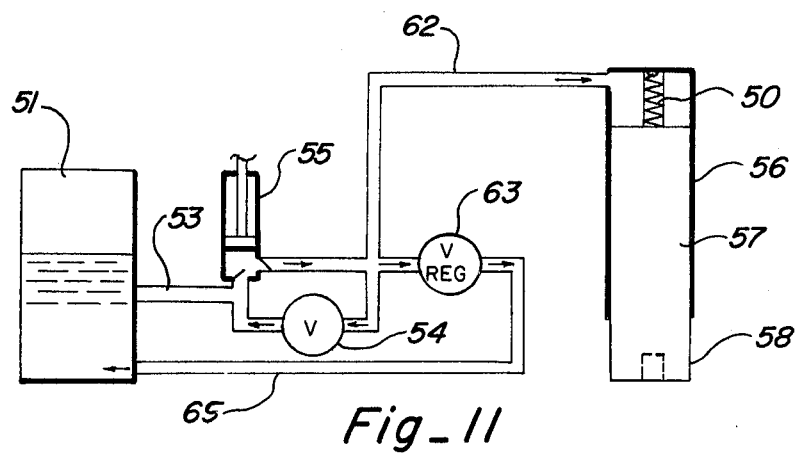
Fig_11

CLAMP FOR TUBULAR BODIES

FIELD OF THE INVENTION

This invention relates generally to clamps for tubular bodies and more particularly to a novel portable hydraulic clamp that is especially suited for clamping a fire hose.

BACKGROUND OF THE INVENTION

There are numerous applications for a clamp for clamping a tubular body. The tubular bodies may be pipes, tubes, hoses and the like which are commonly made of various materials such as plastic, rubber, metal, fabric or a combination thereof. A specific application for which the clamp of the present invention has been found to be particularly suitable is for clamping a fire hose and particularly the larger diameter fire hoses up to as high as a five-inch diameter fire hose.

Briefly, fire hoses are usually folded and carried on the fire truck and when in use are laid out for use along a required course with the inlet coupling at the hydrant and the outlet coupling at a substantial distance from the hydrant which in some cases is, for example, around a corner out of the sight of the operator at the hydrant. In this case it is difficult for the operator to know when to turn on the water at the hydrant. For this situation a clamp closing off flow at the discharge end of the hose allows the fireman to selectively control the flow at the discharge end. In other situations involving the use of fire hoses it may be necessary to cut off the flow to a portion of the hose while it is charged but not flowing and/or to gradually reduce or completely cut off the flow when the water is flowing through the fire hose. Considerable difficulty is encountered in completely cutting off flow through a charged fire hose, and particularly one five inches in diameter, because of the intense pressures involved. The pressure is extremely intense on the clamp just prior to fully closing off the flow and at this time there is a strong tendency for a clamp to be driven along the hose. Another factor in clamping fire hoses is that charged fire hoses are extremely heavy and difficult to lift.

Accordingly it is an object of this invention to provide a simple, durable, reliable, safe, versatile and easy to apply clamp for clamping a variety of types of tubular bodies.

Another object of this invention is to provide a novel clamp that is readily portable and compact for carriage to the point of use, conveniently stored when not in use, and may be applied at one of two operating positions.

Yet another object of the present invention is to provide a novel clamp that grips a relatively broad area of a tubular body along its full width and a substantial portion of its length as well as having jaw faces with clamping edges spaced along the tubular body and constructed and arranged to prevent the jaws from sliding relative to the body being clamped.

Still a further object of the present invention is to provide a clamp that is suitable for applying relatively high clamping pressures to accommodate the clamping off of tubular bodies carrying substantial fluid flow under substantial pressures.

Yet a further object of this invention is to provide a novel hose clamp that has a controlled rate of clamping for gradually cutting down, increasing, or shutting off the flow in a tubular body.

Yet another object of this invention is to provide a novel hydraulic clamp for fire hoses that may be applied without lifting the fire hose.

Still another object of the present invention is to provide a novel clamp suitable for clamping a wide range of diameters and is suitable for positioning the tubular body upon insertion into a clamping position so that the tubular body does not bunch up during the clamping operation.

SUMMARY OF THE INVENTION

A portable clamp, preferably hydraulically powered, for clamping a tubular body and the like is particularly suited for regulating and clamping off the flow through large diameter fire hoses. The clamp includes a stationary jaw preferably formed as a wall portion of a rigid, one-piece support body provided with a cavity. A movable jaw is supported from the support body in the cavity opposite the stationary jaw and is controllably advanced toward the stationary jaw by a hydraulic drive supported on the support body which provides a controlled rate of reducing flow, and the movable jaw is returned by a bias member to a retracted position when the hydraulic pressure is removed. Each of the jaws is provided with a pair of angularly disposed jaw faces that converge toward an apex and engage a substantial surface area of the tubular body. One of the jaw faces has a clamping edge at the apex thereof and the other jaw face has a recess that receives the clamping edge of the one jaw face and provides a pair of clamping edges offset to the sides of the first-mentioned clamping edge along the tubular body so that upon movement of the movable jaw to an extended position the tubular body is bent by forces applied from opposite sides thereof into an angle to close off flow therethrough. The support body has a web portion arranged on an angle across each end portion of the cavity so that upon insertion into the cavity the tubular body goes no further than the center of the stationary jaw face to facilitate the hose being fully flattened in the clamped position without a bunching thereof. The support body and cavity are arranged for operation in more than one position and are arranged for placement over a tubular body so that the tubular body does not have to be lifted or moved for applying the clamp.

Other objects, advantages and capabilities of the present invention will become more apparent as the description proceeds taken in conjunction with the accompanying drawings, in which like parts have similar reference numbers and in which:

FIG. 1 is a perspective view of a hydraulic clamp disposed in one operating position with the open face of a receiving cavity to one side and a tubular body in the cavity with the movable jaw in a partially extended position;

FIG. 2 is an elevation view of the clamp shown in FIG. 1 looking directly into the open face of the cavity with the movable head in a fully extended position clamping off the flow through the tubular body;

FIG. 3 is an end elevation view of the clamp shown in FIG. 1 with the movable jaw in a partially extended position;

FIG. 4 is an end elevational view of the clamp opposite from the end of FIG. 3;

FIG. 5 is an elevational view opposite from the open face of the cavity as shown in FIG. 1;

FIG. 6 is a sectional view taken along lines 6—6 of FIG. 5;

FIG. 7 is an enlarged sectional view through the jaws and tubular body showing the clamping action of a tubular body;

FIG. 8 is an elevational view of the tubular body shown both in the fully open and in the fully closed off position, again illustrating one operating position of the clamp;

FIG. 9 is an elevational view of the clamp rotated 90° and the open face of the cavity facing down in a second operating position;

FIG. 10 is a sectional view taken along lines 10—10 of FIG. 8 showing the tubular body in a flattened clamped off position; and FIG. 11 is a diagrammatic view of the hydraulic system for moving the movable jaw.

DESCRIPTION OF THE PREFERRED EMBODIMENTS

The portable hydraulic clamp 10 shown comprises a stationary clamping jaw 11 that is constructed as a wall of an integral rigid support body 12 having a wall portion 14 opposite and spaced from the stationary jaw 11 which together with a back wall portion 15 defines a generally channel-shaped receiving cavity 16 with an open face opposite the back wall portion 15. A movable jaw 17 is supported from the back wall portion 15 of the support body 12 for reciprocal movement in the cavity between a retracted position and an extended position. A section of a tubular body herein referred to as a hose 18 is shown positioned in the cavity 16 between the stationary jaw 11 and movable jaw 17. The support body 12 which includes the main body portion of jaw 11 is preferably die-cast of a hard, corrosion-resistant metal such as an alloy of aluminum and magnesium.

The support body 12 further has a wall extension portion 21 adjacent the open face of the cavity providing a planar support surface in the plane of the open face of the cavity and the extremities of the stationary jaw 11 and wall portion 14 opposite the back wall portion 15. There is further provided a flange extension 22 that is an extension of the stationary jaw 11 that extends beyond the back wall portion 15.

The support body 12 is further provided with an inclined web portion 23 traversing a portion of each of the ends of the cavity that limits how far the hose 18 will insert into the cavity 16 and is constructed so that the center of the hose 18 does not go past the center of the stationary jaw face as measured along the width thereof. With this arrangement, when the hose is flattened and compressed between the jaws it does not bunch up along the inside of the back wall portion 15. A preferred angle for the web as measured from the stationary jaw is 60°. A flange 24 extends at right angles to the wall portion 14 across the end of the cavity forming a pair of recessed areas 25 and 26 in the support body, as best seen in FIG. 2. Another flange extension 27 projects at right angles to the back wall portion 15. The outer surface of the stationary jaw 11 is recessed toward the center to form a pair of support legs 28 that serve to support the body in the operating position and hold it against movement for some applications, as shown in FIG. 1.

Referring now to the details of the jaw construction, the main body portion of stationary jaw 11 has a pair of angularly disposed inside jaw faces 31 and 32 that converge from opposite extremities toward a central apex. An arcuate, central recess 33 is provided in the jaw face and defines a pair of clamping edges 34 and 35 that take the appearance of relatively sharp teeth which are offset to each side of the center of the stationary jaw. For the clamping of a fire hose or the like the inclined jaw faces and recess are lined with an inner resilient layer 36 which helps to avoid damage to the body being clamped, and in turn there is shown an outer layer 37 to prevent slipping of a wet hose. Layer 37 is preferably a granular material such as carbon that is adhesively secured to layer 36.

As best seen in FIGS. 2 and 7, the movable clamping jaw 17 comprises a rigid main body portion of a metal or the like and, like the stationary jaw 11, has a pair of angularly disposed jaw faces 41 and 42 that converge toward a central apex and define a central clamping edge 43. The jaw faces are shown lined with an inner resilient layer 46 of rubber or rubberized composition which in turn is lined with an outer friction layer 47 to prevent slipping of the jaws on a wet hose or the like. Again the friction layer 47 is the same material as layer 37. The base side of the movable clamping jaw 17 has a recess 48 to receive the central portion of the side wall portion 14.

The angle of inclination of the jaw faces from a fully flat surface or plane normal to the application of clamping forces is relatively small, as on the order of 20°. In this way the apex that forms the central clamping edge on the movable jaw is not sharp and does not tend to sever the hose.

Referring again to the jaw faces, the relatively small angle of inclination in the jaw faces affords a gripping along a substantial length of the hose for an effective clamping area. The jaw surfaces then are seen to engage the entire width of the hose and a substantial length thereof for clamping a relatively broad area of the hose.

While the single clamping edge is shown on the movable jaw and the recess and pair of offset clamping edges are shown on the stationary jaw, it is understood that this relationship could be reversed.

The pair of jaw faces on the stationary jaw and the opposed pair of jaw faces on the movable jaw then form two pairs of opposed jaw faces, each pair of opposed jaw faces diverging away at equal angles from a plane separating the stationary and movable jaws and normal to the direction of movement of the movable jaws. This equal angular relationship has been found to be effective in clamping charged fire hoses.

The hydraulic system for moving the movable jaw may take various forms but as shown comprises a reservoir body portion 51 formed as an integral part of the support body 11 on the inner side of the support wall portion 21. This reservoir body portion 51 contains a fluid 52 and has an output line 53 coupled to the inlet side of the pump 55 which forces the fluid under pressure from the reservoir through an input line 62 to a hydraulic cylinder 56 that is mounted on the support body adjacent reservoir 51. The pump 55 has a conventional cylinder with a piston that operates in response to the up-and-down movement of the handle socket 59 into which is removably inserted a handle 61. The pump 55 then pumps fluid into the hydraulic cylinder 56 so as to gradually move the piston and movable jaw to an extended clamping position. A return spring 50 in the cylinder serves as a bias member to gradually return the piston 57 to the retracted position. A pressure relief valve 63 is coupled to the outlet side of the pump and the inlet side of the cylinder in line 62 by a fitting 64 so that fluid is returned to the reservoir through a line 65 to prevent excessive pressures in the cylinder as when the piston is fully extended and the pump handle 61 continues to be moved. The petcock valve 54 is coupled between the outlet of the pump and inlet of the cylinder in line 62 to return fluid from the cylinder to the reservoir via line 53.

For the grasping of the clamp there is provided a hollow tubular handle section 66 affixed to the flange 22 and extending parallel to the back wall portion 15 as well as an angle section 67 that attaches at one end to the side wall portion and to the side of the handle section 66. The hollow handle section 66 telescopically receives the handle 61 when not used to actuate or release the pressure in the cylinder. This arrangement allows the clamp to be readily grasped when disposed in either operating position.

Of particular importance in clamping off a charged fire hose is the extreme pressure exerted on the jaws just prior to having the hose fully clamped off. To this end the clamping edge on the movable jaw and the pair of offset clamping edges on the stationary jaw which cause the hose to be bent into a slight angle in a kinking action, together with the friction layers, insure a positive grip even on larger diameter fire hoses which prevents the clamp from being propelled down the hose due to these extreme pressures at the clamping points.

The construction and arrangement of the support body and the receiving cavity allows the clamp to be placed on a charged hose without requiring the hose to be raised. This is particularly important in fire hose applications because of the extreme weight of a charged fire hose and particularly a 5-inch diameter fire hose.

OPERATION

In the operation of the clamp, then, the support body may be disposed on the feet 28 of the stationary jaw 11 in one operating position and the hose 18 inserted into the cavity as illustrated in FIG. 8. The handle 61 is reciprocated up and down, pumping fluid via pump 55 into the cylinder 56 to extend the piston 58 and movable jaw 17 as required. For some situations the clamp may not be fully extended and only reduce fluid flow through the hose. In others where a complete closing off of the fluid flow through the hose is required the movable jaw is fully extended as shown in FIG. 2 and the hose is clamped into an angle or kinked. A continued pumping after a full extension causes the fluid to return to the reservoir via valve 63. In order to retract the movable jaw the petcock valve 54 is opened and the spring 50 draws the piston back into the cylinder with the fluid passing via valve 54 back into the reservoir.

As best seen in FIG. 9, the support body may be placed down over the hose without requiring the hose to be lifted, as with larger diameter hoses, and the same clamping procedure is followed as above described.

To move the clamp from one location to another the operator simply grasps the handle section facing up.

Although the present invention has been described with a certain degree of particularity, it is understood that the present disclosure has been made by way of example and that changes in details of structure may be made without departing from the spirit thereof.

What is claimed is:

1. A portable hydraulic clamp for regulating and for closing off flow through a fire hose and the like comprising:
    a stationary jaw having a rigid main body portion formed as an integral wall of a rigid one-piece, die-cast metal support body having a generally channel-shaped hose-receiving cavity formed therein with an open face, said rigid support body having a side wall portion opposite and spaced from said stationary jaw and a back wall portion joining said stationary jaw and said side wall portion, a wall extension adjacent said open face providing a support surface in the plane of the open face and the extremities of said main body portion and wall extension, a flange extension that extends from said stationary jaw beyond said back wall portion, said stationary jaw having foot means on an external surface for supporting the support body in another operating position, said support body having a web portion arranged at an angle of about 60° to said stationary jaw face at each end of the cavity to limit the extent of insertion of the hose into the cavity;
    a first handle section having one end affixed to said flange extension and extending along and spaced from said back wall portion and a second handle section affixed at one end to said first handle section and extending along and spaced from said side wall portion and affixed to said side wall portion, said first handle section being hollow and arranged to telescopically receive a removable actuating handle;
    a movable jaw having a rigid main body portion disposed in said cavity opposite said stationary jaw movable toward and away from said stationary jaw between extended and retracted positions, each of the main body portions of said stationary and movable jaws having a pair of angularly disposed jaw faces that converge toward a central apex at an angle of about 20°, the main body portion of said movable jaw having a first clamping edge at said central apex for applying pressure in a direction transverse to one side of said hose, the jaw faces of said movable jaw having an inner liner of resilient material and an outer liner of a friction material, the main body portion of said stationary jaw having an arcuate recess at said center apex to receive said first clamping edge and provide a pair of clamping edges offset to each side of said first clamping edge along said hose for applying pressure in a direction opposite from said one side of said hose to clamp the hose between said jaws into an angle and prevent relative movement between said hose and said jaws, said jaw faces and the recess of said stationary jaw having an inner liner of resilient material and an outer layer of a friction material; and
    a hydraulic drive system for gradually moving said movable jaw to the extended position, said drive system including a hydraulic cylinder on said side wall portion having a piston movable in said cylinder in response to hydraulic pressure applied to said cylinder, said piston extending through an aperture in said side wall portion and having said movable jaw affixed to the free end thereof, a pump on said side wall portion having a handle socket that is actuated by the movement of said removable actuating handle, a reservoir body forming an integral part of said support body containing a fluid that is pumped by said pump into said cylinder to move said movable jaw to the extended position, a regulator valve coupled to an outlet of the pump and an inlet of the cylinder to return fluid to the reservoir body once a predetermined maximum pressure is reached in said cylinder, and a petcock valve coupled for returning fluid from said cylinder to said reservoir to enable the piston to be returned to the retracted position and a spring member in said cylinder arranged to gradually return said piston to the retracted position when said petcock valve is released.

2. In a clamp for a tubular body and the like, the combination comprising:
a stationary jaw, said stationary jaw being formed as a wall of a support body having a cavity with a receiving opening for a tubular body along a face thereof at right angles to said stationary jaw, said support body having a wall extension opposite said stationary jaw extending normal thereto with a supporting surface in the plane of the receiving opening of the cavity for positioning over a tubular body in one operating position and for receiving the tubular body into a side of the support body in another operating position;
a movable jaw in said cavity supported opposite said stationary jaw for movement toward and away from said stationary jaw between extended and retracted positions, each of said jaws having a pair of angularly disposed jaw faces that converge toward a central apex, one of said jaws having a first clamping edge for applying pressure in a direction transverse to one side of said tubular body and the other of said jaws having a recess to receive said first clamping edge and provide a pair of clamping edges offset to each side of said first clamping edge along said tubular body for applying pressure in a direction opposite from and transverse to said one side of said tubular body and offset to each side of said first clamping edge along said tubular body to clamp a tubular body between said jaws into an angle; and
drive means for gradually moving said movable jaw toward said stationary jaw.

3. In a clamp as set forth in claim 2 wherein said stationary jaw has an external surface provided with feet projecting beyond said external surface on which the support body is supported in said other operating position.

4. In a clamp as set forth in claim 2 including handle means along two different external surfaces of said support body having handle sections arranged at right angles to one another for the lifting of the support body from either of said operating positions.

5. In a clamp for a tubular body and the like, the combination comprising:
first and second jaws disposed opposite one another with at least one of said jaws supported for movement toward and away from the other of said jaws between a clamping position and a non-clamping position, each of said first and second jaws having a pair of angularly disposed jaw faces that converge toward a central apex, the angles of convergence of said pairs of jaw faces for both of said jaws being substantially equal, the pair of angularly disposed converging jaw surfaces of one of said jaws defining a first clamping edge on a first projecting jaw portion, the other of said jaws having a recess disposed and shaped to receive said first projecting portion in the clamping position, said recess being shaped to provide a jaw surface portion that converges toward each of said pair of angularly disposed jaw faces of the associated jaw defining a second clamping edge on a second projecting jaw portion and a third clamping edge on a third projecting jaw portion, said second and third clamping edges being offset to positions on opposite sides of said first clamping edge with minimum spacing between the opposed faces of said first and second jaws at each of said clamping edges for applying maximum clamping pressure at each of said clamping edges along the tubular body to close off flow through the tubular body; and
drive means for gradually moving at least one of said jaws between said positions.

6. In a clamp as set forth in claim 5 wherein each of said jaws clamp a length of the tubular body between said opposed clamping surface areas into an angle when said jaws are in said clamping position.

7. In a clamp as set forth in claim 6 wherein said centrally disposed recess is substantially semicircular in shape.

8. In a clamp as set forth in claim 7 wherein said recess is in the stationary jaw.

9. In a clamp as set forth in claim 5 wherein each of said pairs of jaw faces are lined with a resilient liner.

10. In a clamp as set forth in claim 5 wherein each of said pairs of jaw faces have an outer layer of a friction material.

11. In a clamp as set forth in claim 5 wherein said drive means includes a stationary hydraulic cylinder and a piston movable in said cylinder coupled to said movable jaw for gradually moving said movable jaw toward said extended position for gradually clamping a tubular body disposed between said jaws at a controlled rate.

12. In a clamp as set forth in claim 5 including means to return said movable jaw to said non-clamping position.

13. In a portable hydraulic clamp for a tubular body and the like, the combination comprising:
a stationary jaw formed as a wall portion of a support body having a generally channel-shaped receiving cavity formed therein with an open face, said support body being rigid, one-piece and of die-cast metal, said support body including a side wall portion opposite said stationary jaw and a back wall portion joining said side wall portion and said stationary jaw, said back wall portion being opposite said open face, and a wall extension projecting at right angles to said side wall portion forming a supporting surface which, with the extremities of said side wall portion and said stationary jaw, supports said support body in one operating position, said stationary jaw having legs along a surface for supporting said body in a second operating position;
a movable jaw disposed in said cavity opposite said stationary jaw movable toward and away from the stationary jaw between an extended clamping position and a retracted non-clamping position, said stationary and movable jaw having opposed clamping surface areas shaped to clamp a tubular body therebetween when said jaws are in the extended clamping position; and
drive means including a hydraulic actuator for gradually moving said movable jaw to the extended position and means for returning said jaw to the retracted position.

14. In a portable hydraulic clamp as set forth in claim 13 including a first handle section mounted across the back wall portion and a second handle section across said side wall portion for the carrying of said support body in either of two dispositions.

15. In a portable hyraulic clamp as set forth in claim 14 wherein said first handle section is hollow and telescopically receives a handle for actuating said hydraulic means.

16. In a portable hydraulic clamp as set forth in claim 13 wherein said hydraulic actuator includes a hydraulic cylinder with a reciprocating piston movable in the cylinder and connected to said movable jaws, a fluid reservoir, a pump, and a handle socket that moves to actuate the pump, and means to automatically return said piston to a retracted position.

17. In a portable hydraulic clamp as set forth in claim 16 wherein said reservoir includes a body portion formed as an integral part of said support body and has a spring for returning said piston to the retracted position.

18. In a clamp for a tubular body and the like, the combination comprising:
   first and second jaws with at least one of said jaws supported for movement toward and away from the other of said jaws between an extended clamping position and a retracted non-clamping position, each of said jaws having a pair of angularly disposed jaw faces that converge toward a central apex, said pair of jaw faces having opposed, centrally disposed, clamping surface areas, one of said jaws having jaw faces that form a male clamping edge at the central apex and the other of said jaws having a centrally disposed recess shaped to receive said male clamping edge in the extended clamping position,
   said pair of jaw faces providing a pair of opposed, inclined jaw face portions on each side of said clamping surface areas, each said inclined jaw face portion of each said pair of opposed inclined jaw face portions diverging away from an associated clamping surface area at a substantially equal angle from a plane normal to the direction of movement of said movable jaw to provide a symmetrical disposition of each of said pair of opposed inclined jaw face portions to clamp a tubular body between said jaws into an angle in a stable manner; and
   drive means for gradually moving at least one of said jaws between said positions.

19. In a clamp for a tubular body and the like, the combination comprising:
   a stationary jaw;
   a movable jaw supported opposite said stationary jaw for movement toward and away from said stationary jaw between an extended clamping position and a retracted non-clamping position, each of said jaws having a pair of angularly disposed jaw faces that converge toward a central apex, the angles of convergence of said pairs of jaw faces for both of said jaws being substantially equal to provide a symmetrical disposition of opposed inclined jaw faces to clamp a tubular body between said jaws into an angle in a stable manner, the pair of angularly disposed converging jaw surfaces of one of said jaws defining a first clamping edge on a first projecting jaw portion, the other of said jaws having a recess disposed and shaped to receive said first projecting portion in the clamping position, said recess being shaped to provide a jaw surface portion that converges toward each of said pair of angularly disposed jaw faces of the associated jaw defining a second clamping edge on a second projecting jaw portion and a third clamping edge on a third projecting jaw portion, said second and third clamping edges being offset to positions on opposite sides of said first clamping edge with minimum spacing between the opposed faces of said stationary and movable jaws at each of said clamping edges for applying maximum clamping pressure at each of said clamping edges to clamp a length of the tubular body disposed between said opposed clamping surface area portions into an angle; and
   drive means for gradually moving said movable jaw between said positions.

20. In a clamp for a tubular body and the like, the combination comprising:
   first and second jaws with at least one of said jaws supported for movement toward and away from the other of said jaws between a clamping position and a non-clamping position and a support body including a main body portion of which the stationary of said jaws is an integral part, said main body portion including a side wall portion opposite said stationary jaw and a back wall portion joining said side wall portion and said stationary jaw and defining a generally channel-shaped cavity with a receiving opening opposite said back wall portion into which a tubular body is inserted for clamping; and
   graduated means permitting a flattened tubular body to rest flat against the stationary jaw in space relation to the back wall portion and limiting the extent of the insertion of a tubular body so that the tubular body is held away from the back wall portion during clamping and so that the center of the tubular body does not go past the center of the stationary jaw as measured along the width thereof.

21. In a clamp as set forth in claim 20, wherein said graduated means is in the form of inclined web portions traversing both ends of said channel-shaped cavity in said main body portion and projecting normal to and away from said back wall portion, said inclined web portions being of minimum extent adjacent said stationary jaw and maximum extent adjacent said side wall portion.

* * * * *